Sept. 12, 1939.   P. CARLSON   2,172,830

GUARDRAIL

Filed Feb. 11, 1938

INVENTOR
PHILIP CARLSON
BY
ATTORNEY

Patented Sept. 12, 1939

2,172,830

UNITED STATES PATENT OFFICE 2,172,830

GUARDRAIL

Philip Carlson, Long Hill, Conn., assignor to The Metropolitan Body Company, Bridgeport, Conn., a corporation of Connecticut Application February 11, 1938, Serial No. 189,946

8 Claims. (Cl. 293—57)

This invention relates to new and useful improvements in vehicles and has particular relation to motor driven delivery vehicles and the protection of the side panels thereof.

The objects and advantages of the invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

In the drawing:—

Figure 1:
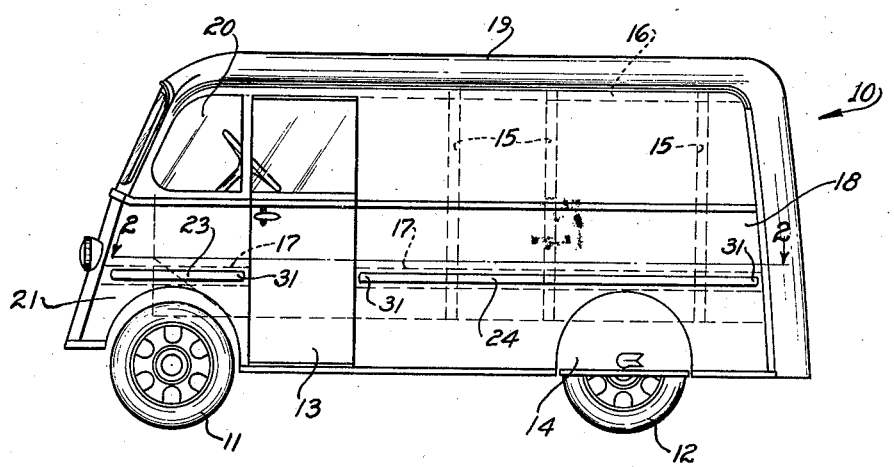
Fig. 1 is a side elevational view showing a vehicle constructed in accordance with the invention.

Referring in detail to the drawing at 10 is shown a motor vehicle body of a length and width to enclose its front and rear ground engaging wheels 11 and 12. In its side wall body 10 is provided with a door 13 which may be a sliding door or otherwise as desired. Door 13 is located slightly to the rear of the front ground engaging wheels 11.

It is noted that the upper portions of wheels 11 and 12 are substantially above the lower edge of the body 10. Actually the side walls of the body are slightly beyond or laterally of the outer sides of the wheels 11 and 12. Panels 14 may be provided to cover the upper portions of wheels 12 under normal conditions and are removable to give access to the wheels for the changing of tires.

The body 10 includes vertical and horizontal frame members 15 and 16 respectively and the number of such members may vary as found desirable. One horizontal member is designated 17 in the drawing whereby to distinguish it in later portions of this description. Secured to the outer sides of the frame members are plywood panels 18a covered by thin sheet metal panels 18.

Panels 18 and 18a may be secured in any desired manner or by any desired means and extend from the rear edge of the opening for door 13 to the rear end of the body and from the lower edge of the body to the top 19 thereof.

Also at the front side of the door opening, below a window 20, a panel or panels 21 of plywood covered by sheet metal, close the sides of the frame structure.

Figure 2:
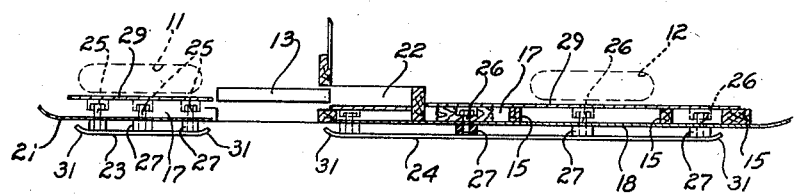
Fig. 2 is a horizontal sectional view through a side wall of the vehicle, the view being taken as along the line 2—2 of Fig. 1.

Fig. 2 at 22 shows a pocket into which the door 13 may be slid when moved to open position and from such figure it will be apparent that the outer side panels 18 and 21 of the body 10 are at the outer sides of or laterally of the door 13 and the vehicle wheels 11 and 12.

Disposed at the outer sides of the panels 21 above the front vehicle wheels 11 is a rub rail section 23 preferably formed of spring steel. A rub rail section 24 is mounted on the rear portion of the truck body and extends from the rear side of the opening for door 13 substantially to the rear of the body and is located at a point above the rear wheels 12 and in fact above the removable wheel covering panel 14. Rail section 24 is also of spring steel.

Figure 3:
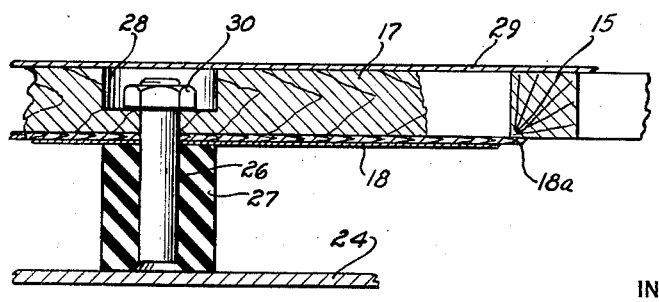
Fig. 3 is an enlarged detail sectional view showing one of the means mounting the rub rail on the vehicle body.

Rail section 23 has a number of bolts 25 welded or otherwise attached thereto at the inner side thereof and such bolts pass through the panels 21 and into the horizontal frame member 17 as best shown in Fig. 2. The manner in which these bolts are mounted will be clear from a consideration of the description to follow in connection with Fig. 3.

Rail section 24 has a series of bolts 26 welded or otherwise secured thereto and such bolts pass through the panels 18 and enter the horizontal frame member 17 at the rear of the door opening. Bolts 26 have the same function with respect to rail section 24 as the bolts 25 have to the rail section 23. The mounting of bolts 26 as well as the mounting of the bolts 25 is that fully illustrated in Fig. 3.

In that figure it will be noted that interposed between the rail and the side panels of the body and disposed about the shanks of the bolts are rubber or other yielding cushioning blocks 27. The bolts on passing through such blocks pass through the side panels and into the horizontal frame members of the body. Such frame members are provided with recesses 28 corresponding in number and with spacing with the bolts 25 and 26 and are adapted to and do receive the inner ends of the bolts.

The bolts are of such length that with the blocks 27 in place the inner ends of the bolts are in the recesses 28 and do not project at the inner side of the body. A metal strip 29 secured to the inner side of the frame member 17 serves to cover the recesses 28. On the ends of the bolts within the recesses 28 are nuts 30 whereby withdrawal of the bolts is limited or prevented and whereby the rub rail is mounted.

The rub rail when mounted as described will be disposed laterally of the panels of the body 10. Therefore should the vehicle be driven in such a manner that its side is brought against an obstruction as a vertical support or pillar in a garage or the like, the rail will engage such object and the side panels of the body will not be damaged as by being pushed in or dented. As pressure comes on the rail it may yield or give between a pair of the rubber blocks 27 as the rail is of spring steel and on the pressure being relieved the rail will spring back to normal position.

In addition should the pressure be applied in such place or in such manner as to require it the rubber blocks 27 will yield and save the side panels of the vehicle body. Obviously as the rubber blocks yield the bolts will move inwardly but it is noted that their inner ends are normally spaced from the metal strip 29 so that they may have a certain limited movement in the recesses.

With vehicles of the type wherein the sides are beyond or laterally of the wheels the side panels of the vehicle are subject to damage as they are not protected by the usual wheel and mud guard construction. The panels are usually of large sheets of metal and are easily deformed or dented by coming into contact with a pillar or the like of a garage, etc. In the present construction the rail sections projecting as described protect the entire sides of the vehicle body.

Any force applied to the rail sections is transmitted by them to the frame member 17 independent of the side panels of the vehicle body. Thus the pressure may not be applied to the panel at an unsupported point. As any lateral pressure will be transmitted to the vehicle frame independent of the panels covering such frame it will be apparent that the panels will not be dented or otherwise damaged.

Also attention is directed to the fact that the end portions 31 of the rail sections 23 and 24 are curved inwardly toward the body 10 whereby should such end portions come against an object a cam-like action may take place and no undue pressure will be applied such as might tend to tear the rail from the vehicle.

Having thus set forth the nature of my invention, what I claim is:

1. In a motor driven vehicle comprising ground engaging wheels and a body including side panels located at the outer sides of the plane of said wheels, frame members at the inner sides of and mounting said panels and of which one frame member is horizontally disposed, a metal rub rail at the outer side of said panels and extending longitudinally of said body in parallel relation with said horizontal frame member, mounting means secured to said rail at spaced points and passing slidably through said side panels and into said horizontal frame member to mount the rail, and spacer blocks about said means between the rail and body side panels and comprising yieldable material whereby to permit of movement of said rail toward and from said body side panels without strain on the latter.

2. In a motor driven vehicle comprising ground engaging wheels and a body including side panels located at the outer sides of the plane of the wheels, said body including a horizontal frame member at the inner sides of said side panels, a spring metal rail at the outer side of said panels and parallel with said frame member, mounting means secured to said rail at spaced points and passing slidably through said panels and into said frame member to mount the rail, and rubber spacer blocks about said means between the rail and said body whereby to permit of movement of said rail toward and from said side body panels without strain on the latter.

3. In a motor driven vehicle comprising ground engaging wheels and a body including side panels above and at the outer sides of said wheels, a frame at the inner sides of the mounting said side panels, a spring metal rail located laterally of and at the outer sides of said side panels and substantially higher than the upper portions of said wheels, and means passing slidably through said side panels and anchoring said rail to said frame for movement independent of said panels.

4. In a motor driven vehicle comprising ground engaging wheels and a body including a frame mounting side panels at the outer sides of the plane of said wheels, a frame at the inner side of and mounting said side panels, said side panels extending from about mid-way the height of said wheels to a point above the same, a removable panel covering the upper portion of the rear wheel, a spring metal rail located outwardly of said panels, means securing said rail to the body frame independent of said panels, and said rail located laterally of and entirely above said removable panel.

5. In a motor driven vehicle comprising ground engaging wheels and a body including a frame mounting side panels above and at the outer sides of the plane of said wheels, a frame at the inner side of and mounting said side panels, said body having a side door opening intermediate its front and rear wheels, a pair of rail sections disposed outwardly of the outer surfaces of said panels and located one forwardly and the other rearwardly of said door opening, said other rail extending from the rear of said door opening substantially to the rear of said body, said rail sections each comprising a length of spring metal, and means anchoring said sections to said frame independent of said side panels.

6. In a motor driven vehicle comprising ground engaging wheels and a body including a frame mounting side panels at the outer sides of said wheels, a frame at the inner side of and mounting said side panels, a spring metal rail located laterally of said side panels and substantially higher than the upper portions of said wheels, spaced means passing through said panels and securing said rail to said frame independent of said panels, and compressible spacer blocks about said means between the rail and said panels.

7. In a motor driven delivery vehicle comprising ground engaging wheels and a box-like body extending forwardly and rearwardly and laterally beyond said wheels, said body including a frame, side body panels located laterally outwardly of said wheels and secured to said frame, said body having a side door opening intermediate its front and rear wheels, a pair of rail sections disposed outwardly of the outer surfaces of said side panels and located one forwardly and the other rearwardly of said door opening, said rail sections each comprising a length of spring metal, means anchoring said rail sections to said body frame independent of said side panels, and said rail sections having their ends curved inwardly toward but stopping short of said side panels.

8. In a motor driven delivery vehicle comprising ground engaging wheels and a body including side panels located at the outer sides of the plane of said wheels, frame members at the inner sides of and mounting said panels and of which one frame member is horizontally disposed, a metal guard rail at the outer side of said panels and extending longitudinally of said body and parallel with said horizontal frame member, mounting means secured to said rail at spaced points and having their inner ends passing slidably through said panels and into said horizontal frame member, means on the inner ends of said mounting means and preventing withdrawal thereof outwardly from said horizontal frame member, and yieldable spacer blocks about said mounting means and filling the space between the rail and the said body panels and limiting movement of said mounting means inwardly with respect to said horizontal frame member.

PHILIP CARLSON.